US012648064B2

(12) United States Patent
Deurenberg et al.

(10) Patent No.: US 12,648,064 B2
(45) Date of Patent: Jun. 2, 2026

(54) DISCHARGE CIRCUITRY DESIGN FOR PEAK CURRENT ELIMINATION OF EXCHANGEABLE MODULES

(71) Applicant: SIGNIFY HOLDING B.V., Eindhoven (NL)

(72) Inventors: Peter Hubertus Franciscus Deurenberg, Eindhoven (NL); Herman Johannes Gertrudis Gielen, Eindhoven (NL); Remco Christianus Wilhelmus Leermakers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 388 days.

(21) Appl. No.: 17/056,055

(22) PCT Filed: May 13, 2019

(86) PCT No.: PCT/EP2019/062139

§ 371 (c)(1),
(2) Date: Nov. 17, 2020

(87) PCT Pub. No.: WO2019/219566

PCT Pub. Date: Nov. 21, 2019

(65) Prior Publication Data

US 2025/0056694 A1 Feb. 13, 2025

(30) Foreign Application Priority Data

May 18, 2018 (EP) .................................... 18173081

(51) Int. Cl.
*H05B 45/50* (2022.01)
*H05B 45/48* (2020.01)
(Continued)

(52) U.S. Cl.
CPC ............. *H05B 45/48* (2020.01); *H05B 45/54* (2020.01); *H05B 47/25* (2020.01)

(58) Field of Classification Search
CPC ........ H05B 45/00; H05B 45/30; H05B 45/40; H05B 45/48; H05B 45/50; H05B 45/54; H05B 47/24; H05B 47/25
See application file for complete search history.

(56) References Cited

U.S. PATENT DOCUMENTS

| | | | | |
|---|---|---|---|---|
| 9,148,916 | B2 * | 9/2015 | Chang | H05B 45/395 |
| 2003/0035311 | A1 | 2/2003 | Phadeke | |

(Continued)

FOREIGN PATENT DOCUMENTS

| | | | |
|---|---|---|---|
| CN | 102118106 | A | 7/2011 |
| CN | 105141375 | A | 12/2015 |

(Continued)

*Primary Examiner* — Thai Pham

(57) ABSTRACT

The invention describes a replaceable LED circuit for coupling to an LED driver. The replaceable LED circuit comprises a pair of input pins for receiving a power supplied by LED driver, an LED string coupled between the pair of input pins for receiving the power, and a surge protection circuit coupled in parallel to the LED string. The surge protection circuit comprises a capacitor arranged to charge when the power is supplied to the LED string, and a current regulator coupled in series with the capacitor and arranged such that it allows the capacitor to charge and prevents the capacitor to discharge into the LED string.

11 Claims, 2 Drawing Sheets

(51) Int. Cl.
*H05B 45/54* (2020.01)
*H05B 47/25* (2020.01)

(56) References Cited

U.S. PATENT DOCUMENTS

| | | | | |
|---|---|---|---|---|
| 2011/0164339 | A1* | 7/2011 | Schmid | H02M 1/4208 361/18 |
| 2012/0223650 | A1 | 9/2012 | Radermacher | |
| 2013/0049618 | A1* | 2/2013 | Radermacher | H05B 47/10 363/126 |
| 2013/0069547 | A1* | 3/2013 | van de Ven | H05B 45/44 315/188 |
| 2013/0278157 | A1* | 10/2013 | Radermacher | H05B 45/50 315/186 |
| 2013/0293122 | A1 | 11/2013 | Huynh | |
| 2014/0375217 | A1* | 12/2014 | Feri | H05B 47/195 315/151 |
| 2015/0237699 | A1* | 8/2015 | Kim | H05B 45/44 315/186 |
| 2015/0327341 | A1* | 11/2015 | Kim | H05B 45/345 315/224 |
| 2016/0050724 | A1* | 2/2016 | Moon | H05B 45/48 315/200 R |
| 2016/0278171 | A1* | 9/2016 | Jermyn | H05B 45/10 |
| 2023/0309210 | A1* | 9/2023 | Haverlag | H04B 10/116 |

FOREIGN PATENT DOCUMENTS

| | | | |
|---|---|---|---|
| EP | 2104201 | A2 | 9/2009 |
| EP | 2360820 | A1 | 8/2011 |
| JP | 2000306254 | A | 11/2000 |
| JP | 2008204866 | A | 9/2008 |
| JP | 2011244141 | A | 12/2011 |
| JP | 2014514686 | A | 6/2014 |
| WO | 9601002 | A1 | 1/1996 |

* cited by examiner

DISCHARGE CIRCUITRY DESIGN FOR PEAK CURRENT ELIMINATION OF EXCHANGEABLE MODULES

CROSS-REFERENCE TO PRIOR APPLICATIONS

This application is the U.S. National Phase application under 35 U.S.C. § 371 of International Application No. PCT/EP2019/062139, filed on May 13, 2019, which claims the benefit of European Patent application Ser. No. 18/173,081.3, filed on May 18, 2018. These applications are hereby incorporated by reference herein.

FIELD OF THE INVENTION

The invention relates to a replaceable LED circuit. The invention further relates to a luminaire comprising the replaceable LED circuit.

BACKGROUND OF THE INVENTION

In the future, LED modules will become exchangeable in the field. This is driven by legislation (circular economy) and by the need to replace incidentally failed modules in the field. In the replacement of these modules it is expected that not in all cases the LED driver that is powering the system will be switched off before exchanging the LED modules. In that case a peak current may be delivered by the output stage of the LED driver to the module when the electrical connection between the new LED module and the LED driver is made, that might damage the LEDs.

SUMMARY OF THE INVENTION

The invention described here makes that, in case LED modules are exchanged without switching off the LED driver, the peak current delivered by the LED driver output stage will be reduced before it reaches the LEDs and potential damages the LEDs. This peak current is also called an outrush current since it is a peak current originating from the output of the LED driver. It is an insight of the inventors that when the LED module is replaced by another LED module and a peak current is delivered by the LED driver, upon connecting the new LED module to the LED driver, the LEDs will be damaged resulting in a lower expected lifetime. Therefore, it is important to even prevent this single peak current to flow through the LEDs.

It is an objective of the invention to provide a replaceable LED circuit that reduces the peak current through the LEDs such that the LEDs are not damaged by the peak current.

To overcome this concern, in a first aspect of the invention a replaceable LED circuit comprises:

- a pair of input pins for receiving a power supplied by a power supply,
- an LED string coupled between the pair of input pins for receiving the power, and
- a surge protection circuit coupled in parallel to the LED string, the surge protection circuit comprising:
  - a capacitor arranged to charge when the power is supplied to the LED string,
  - a current regulator coupled in series with the capacitor and arranged such that it allows the capacitor to charge and prevents the capacitor to discharge into the LED string.

When the replaceable LED circuit is coupled to an active LED driver, the surge protection circuit will discharge the output stage of the LED driver such that the inrush current through the LED string is reduced, reducing the impact of the inrush current on the lifetime of the LED string. The current regulator prevents any current to flow from the capacitor to flow to the LED string. Such current flow could have a negative impact on the behavior of the LED driver.

In a further example, the surge protection circuit further comprises a discharge circuit for discharging the capacitor.

This allows the capacitor to discharge after the LED driver stops supplying current to the replaceable LED circuit. In case of another reconnection of the replaceable LED circuit with another LED driver, the capacitor is discharged, allowing another inrush current to be absorbed.

In a further example, the current regulator is a diode.

This provides a simple and cheap implementation for allowing the inrush current to be absorbed by the capacitor and preventing the capacitor to discharge through the LED string.

In a further example, the current regulator is a semiconductor switch.

This provides a more versatile implementation for allowing the inrush current to be absorbed by the capacitor and preventing the capacitor to discharge through the LED string.

In a further example, the semiconductor switch is closed when the replaceable LED circuit board is connected to the LED driver such that the inrush current through the replaceable LED circuit board remains within a safe operating area of the replaceable LED circuit board.

When the replaceable LED circuit is coupled to an active LED driver, the surge protection circuit will discharge the output stage of the LED driver such that the inrush current through the LED string is kept within the safe operating area of the LED string. If the inrush current remains within the safe operating area of the LED string, there is no negative impact on the lifetime of the LED string.

In a further example the LED string is configured to operate using light fidelity or visible light communication protocols.

In this situation, no capacitance may occur in parallel with the LED string. This might interfere the communication protocols. The current regulator prevents the capacitor from having any impact on the LED string current in normal operating mode.

In a further example during charging of the capacitor, a current through the LED string does not exceed four times a nominal current of the LED string.

As long as the inrush current through the LED string remains below four times the nominal current, the lifetime of the LED string can be guaranteed to be at least 20,000 h.

In a further example, the LED string and the surge protection circuit are placed on a same printed circuit board.

Having the surge protection circuit on the same printed circuit board as the LED string assures that the protection circuit will at least protect the LED string once.

In a further example, the capacitor is of a multi-layer ceramic capacitor type.

This type of capacitors is most suited for absorbing inrush currents.

In another example, a luminaire comprises:

- the replaceable LED circuit according to any of the preceding claims,
- an LED driver for providing power to the replaceable LED circuit board.

The luminaire has a replaceable LED circuit that allows safe replacement of an LED string without having to turn off the luminaire.

BRIEF DESCRIPTION OF THE DRAWINGS

Examples of the invention will now be described with reference to the accompanying drawings, in which.

DETAILED DESCRIPTION OF THE EMBODIMENTS

Figure 1:
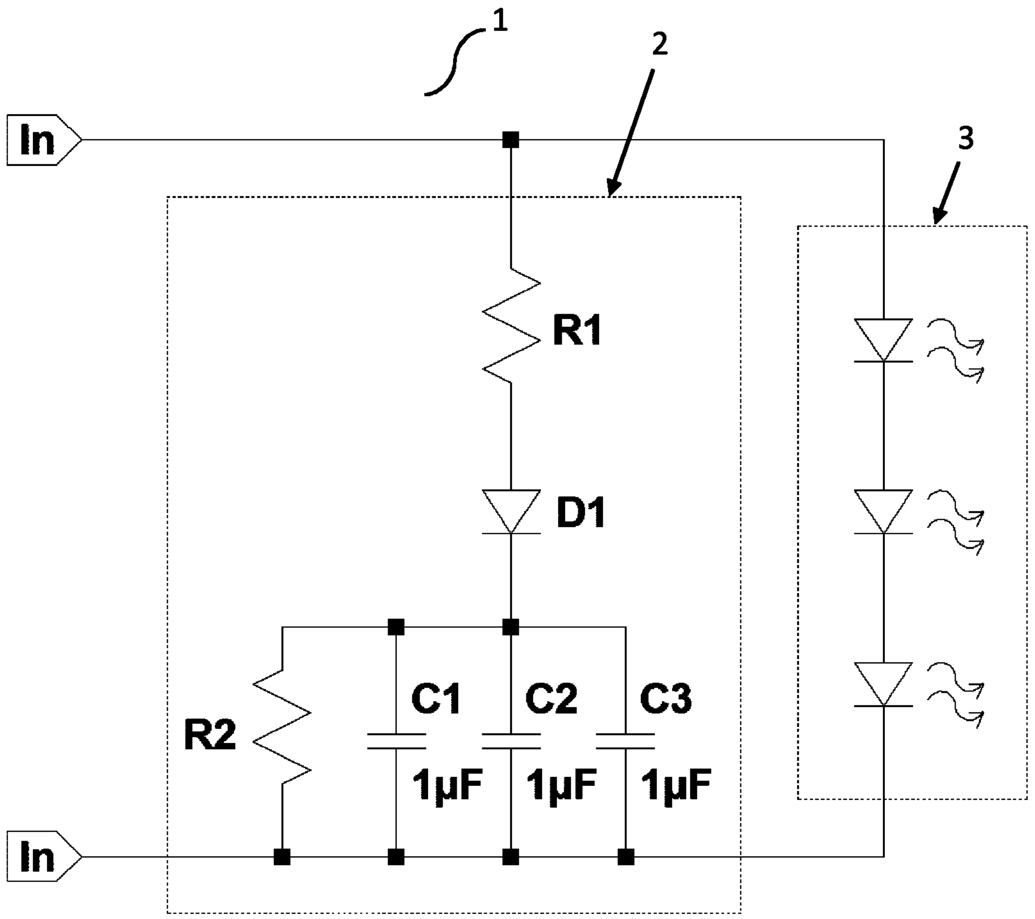
FIG. 1 shows an example of a replaceable LED circuit arranged to reduce a peak current through the LEDs when connected to an active LED driver.

FIG. 1 shows an example of a replaceable LED circuit 1. The replaceable LED circuit 1 has input pins In for receiving a power supplied by a LED driver. The replaceable LED circuit 1 further has an LED string 3 emitting light when the current provided by the LED driver. A surge protection circuit 2 is coupled in parallel with the LED string 3. The surge protection circuit 2 comprises a current regulator D1 in series with a capacitor C1, C2, C3. In this example, the current regulator D1 is a diode placed such that the capacitor C1, C2, C3 can be charged by the current of the LED driver but not discharged via the LED string 3.

A resistor R1 can be introduced to prevent a too large current to flow through the surge protection circuit 2, which would otherwise damage one of the diode D1 and the capacitor C1, C2, C3.

A discharge circuit R2 can be introduced for discharging the capacitor C1, C2, C3 when the replaceable LED circuit 1 is not receiving any current. In this example, the discharge circuit R2 is embodied as a resistor. The discharge circuit R2 may also be an active circuit that only discharges the capacitor C1, C2, C3 when the LED driver is not providing any current to the replaceable LED circuit 1.

The capacitor C1, C2, C3 can have any value and mainly depends on the current capabilities of the LED string 3 and the LED driver. The value of the capacitor C1, C2, C3 can be tuned such that the peak current is reduced to such a level that the LED string 3 is no longer damaged.

The LED driver providing power to the LED string 3 can be a constant current source. The LED driver provides the current for the LED string 3 to emit light. When an LED in the string breaks down, the light output of the LED string 3 is reduced. The LEDs are therefore mounted in a replaceable LED circuit 1 such that broken LEDs can be replaced. There are situations wherein the LED driver is not turned off or cannot be turned off. When the replaceable LED circuit 1 is disconnected from the LED driver, the voltage at the output of the LED driver will run up to the maximum allowable voltage of the LED driver. This is normally regulated by an overvoltage protection in the LED driver. When a new replaceable LED circuit 1 is coupled to the output of the LED driver a peak current will flow through the LED string 3 because the output voltage of the LED driver is much larger than the forward voltage of the LED string 3. This voltage difference will result in a peak current flowing from the LED driver towards the LED string 3. The surge protection circuit 2 can be placed on the same printed circuit board, PCB, as the LED string 3. This surge protection circuit 2 will absorb most of the peak current such that the LED string 3 will not be damaged by the remaining current. The current regulator D1 has a low impedance for the peak current allowing the current to easily flow through the surge protection circuit 2 and storing the peak current energy in the capacitor C1, C2, C3.

Since the capacitor C1, C2, C3 is (partially) charged after absorbing a peak current, the surge protection circuit 2 will not be able to provide further protection against peak currents. In some situations, it might be desired to provide further protection against multiple peak currents for example each time the LED driver start up. A discharge circuit R2 can then be used in parallel with the capacitor C1, C2, C3 to discharge the capacitor when no current is provided to the replaceable LED circuit 1. The discharge circuit R2 shown in FIG. 1 is implemented as a resistor. This provides discharge of the capacitor C1, C2, C3 when no current is provided to the replaceable LED circuit 1 but also during operation of the LED string 3, introducing additional losses in the replaceable LED circuit 1. Another implementation of a discharge circuit R2 is to introduce a smart circuit that only discharges the capacitor C1, C2, C3 when there is no current provided by the LED driver. A way of detecting if no current is provided by sensing a high frequency signal on the input pin. The high frequency signal comes from the switching behavior of the LED driver and will be transposed towards the LED string 3 as a triangular current waveform, resulting in a voltage ripple on the LED forward voltage.

Figure 2:
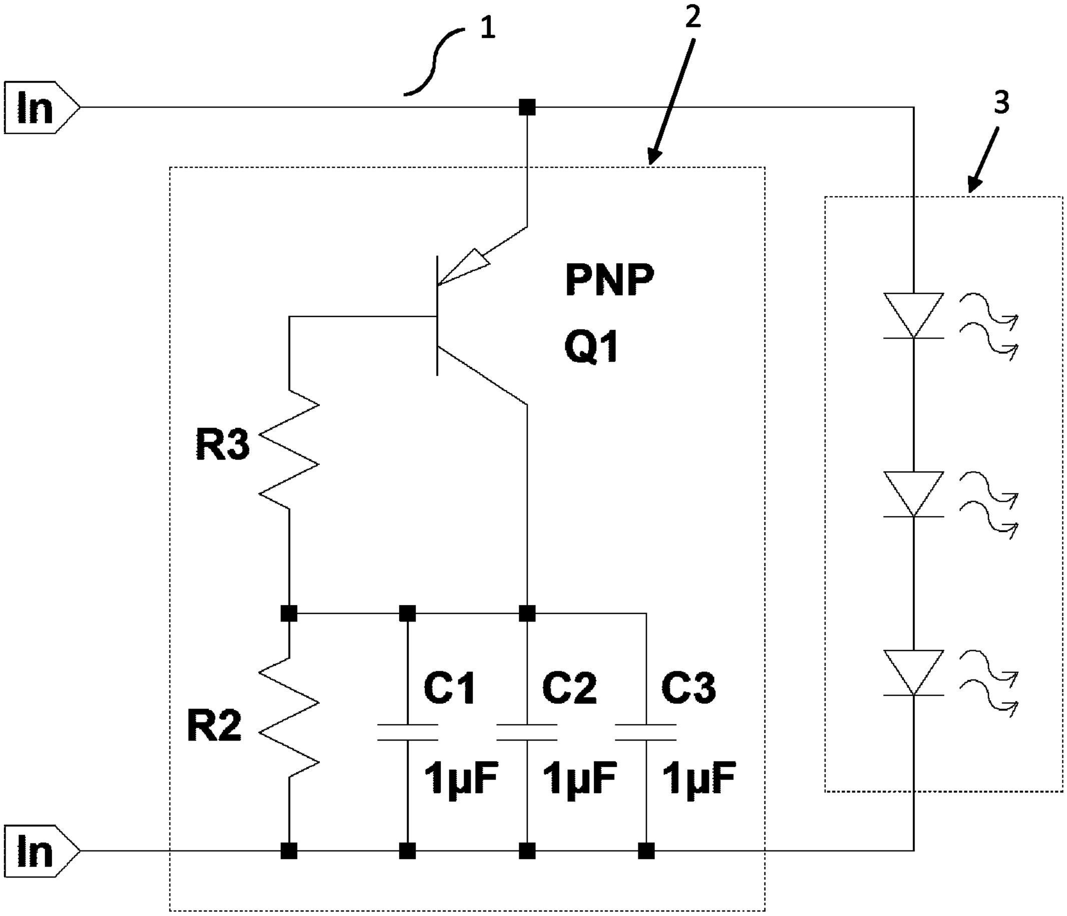
FIG. 2 shows a further example of a replaceable LED circuit arranged to reduce a peak current through the LEDs when connected to an active LED driver.

FIG. 2 shows an example of a replaceable LED circuit 1. The replaceable LED circuit 1 has input pins In for receiving a power supplied by an LED driver. The replaceable LED circuit 1 further has an LED string 3 emitting light when the current provided by the LED driver. A surge protection circuit 2 is coupled in parallel with the LED string 3. The surge protection circuit 2 comprises a current regulator Q1 in series with a capacitor C1, C2, C3. In this example, the current regulator Q1 is a switching element, in this example further embodied as a transistor. The transistor starts conducting when the input voltage exceeds the forward voltage of the base-source node of the transistor. The capacitor C1, C2, C3 charges up to the LED string forward voltage minus the voltage drop over the transistor. The transistor may also be controlled via an external control signal. The transistor can then also be used to controllably allow current to flow into the capacitor C1, C2, C3. If for example the LED string 3 is driven by a standard constant current source, additional capacitance may help improve the current stability. The transistor can in this case remain closed such that the capacitor C1, C2, C3 can discharge through the LED string 3. If the LED string 3 is driven with a pulse width modulated current, e.g. during dimming or during operating the LED string 3 for coded light or LiFi, additional capacitance in parallel with the LED string 3 is undesired. The transistor can then remain open such that the capacitor C1, C2, C3 cannot discharge through the LED string 3.

In all examples, the LED string 3 and the surge protection circuit 2 may be placed on the same printed circuit board.

In all examples, the capacitor C1, C2, C3 can be one of the multi-layer ceramic type, film capacitor, tantalum capacitor or electrolytic capacitor.

The invention claimed is:

1. A replaceable light emitting diode (LED) circuit arranged to be coupled to an active LED driver, the replaceable LED circuit comprising:

a pair of input pins (In) for receiving a power supplied by the LED driver, an LED string coupled between the pair of input pins (In) for receiving the power, and a surge protection circuit coupled in parallel to the LED string, the surge protection circuit comprising:

a capacitor (C1, C2, C3) arranged to charge when the power is supplied to the LED string, a current regulator (D1, Q1) coupled in series with the capacitor (C1, C2, C3) and arranged such that it allows the capacitor (C1, C2, C3) to charge and prevents the capacitor (C1, C2, C3) to discharge into the LED string.

2. The replaceable LED circuit according to claim 1 wherein the surge protection circuit further comprises a discharge circuit (R2) for discharging the capacitor (C1, C2, C3).

3. The replaceable LED circuit according to claim 1, wherein the current regulator (D1, Q1) is a diode.

4. The replaceable LED circuit according to claim 1 wherein, the current regulator (D1, Q1) is a semiconductor switch.

5. The replaceable LED circuit according to claim 4 wherein, the semiconductor switch is closed when the replaceable LED circuit is connected to the driver such that the inrush current through the replaceable LED circuit remains within a safe operating area of the replaceable LED circuit.

6. The replaceable LED circuit according to claim 1, wherein the LED string is configured to operate using light fidelity or visible light communication protocols.

7. The replaceable LED circuit according to claim 1, wherein the LED string and the surge protection circuit are placed on a same printed circuit board.

8. The replaceable LED circuit according to claim 1, wherein the capacitor (C1, C2, C3) is of a multi-layer ceramic capacitor type.

9. A luminaire comprising:

the replaceable LED circuit according to claim 1, an LED driver for providing power to the replaceable LED circuit.

10. The luminaire according to claim 9, wherein the LED driver is a constant current driver.

11. A replaceable light emitting diode (LED) circuit arranged to be coupled to an active LED driver, the replaceable LED circuit comprising:

a pair of input pins (In) for receiving a power supplied by the LED driver, an LED string coupled between the pair of input pins (In) for receiving the power, and a surge protection circuit coupled in parallel to the LED string, the surge protection circuit comprising:

a capacitor (C1, C2, C3) coupled in parallel to the LED string and arranged to charge when the power is supplied to the LED string, a current regulator (D1, Q1) coupled in series with the capacitor (C1, C2, C3) and arranged such that it allows the capacitor (C1, C2, C3) to charge and prevents the capacitor (C1, C2, C3) to discharge into the LED string.

* * * * *